United States Patent [19]
Culley

[11] Patent Number: 6,158,362
[45] Date of Patent: Dec. 12, 2000

[54] EXPANDABLE STINGER PLANTER

[76] Inventor: Daniel A. Culley, 128 Davis Hollow, Dayton, Wash. 99328

[21] Appl. No.: 09/338,322

[22] Filed: Jun. 22, 1999

[51] Int. Cl.$^7$ .................................................... A01C 11/00
[52] U.S. Cl. .......................... 111/117; 111/115; 111/101; 111/102; 37/403; 37/406; 414/912
[58] Field of Search .................................. 111/100, 101, 111/102, 104, 106, 115, 117, 200, 919; 37/403, 406; 414/912; 47/1.01 R, 1.01 F, 1.01 T

[56] References Cited

U.S. PATENT DOCUMENTS

| | | | |
|---|---|---|---|
| 1,077,822 | 11/1913 | Engleman | 111/115 |
| 2,891,813 | 6/1959 | Inaki | 111/115 |
| 3,176,635 | 4/1965 | Mabon | 111/115 |
| 3,765,347 | 10/1973 | Tormstrom | 111/115 |
| 3,972,294 | 8/1976 | Grundstrom et al. | 111/3 |
| 4,067,268 | 1/1978 | Lofgren et al. | 111/115 |
| 4,920,900 | 5/1990 | Clemens | 111/115 |
| 4,941,416 | 7/1990 | Faulring | 111/115 X |

Primary Examiner—Victor Babon
Attorney, Agent, or Firm—Wells, St. John, Roberts, Gregory & Matkin, P.S.

[57] ABSTRACT

An expandable stinger planter is described for attachment to an excavator type boom. The planter includes a frame arrangement that may be releasably secured to the boom, with a stinger depending therefrom. The boom may be selectively operated to drive the probes deep into the ground. The stinger includes a pair of elongated probes that have bottom ends configured to be opened and closed by operation of an actuator assembly. The actuator assembly is selectively operable to shift the probes relative to one another between a closed position wherein the bottom ends are closed together, and an open position wherein the bottom ends are spaced apart from one another to form a plant discharge opening. The probes form an upwardly open internal plant receiving receptacle that is open to the plant discharge opening at the open position whereby a plant placed in the plant receiving receptacle may be discharged through the plant discharge opening as the probes are lifted by the boom.

20 Claims, 11 Drawing Sheets

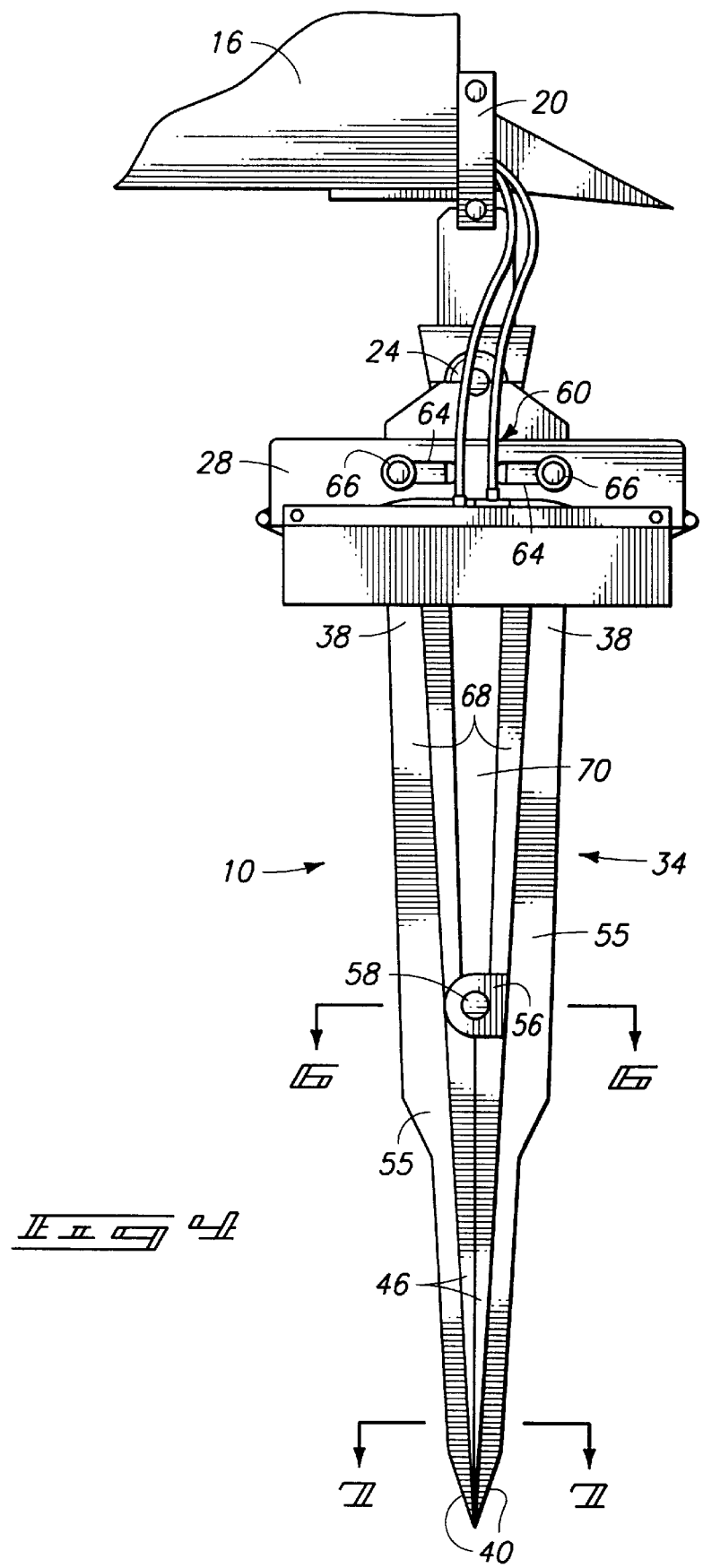

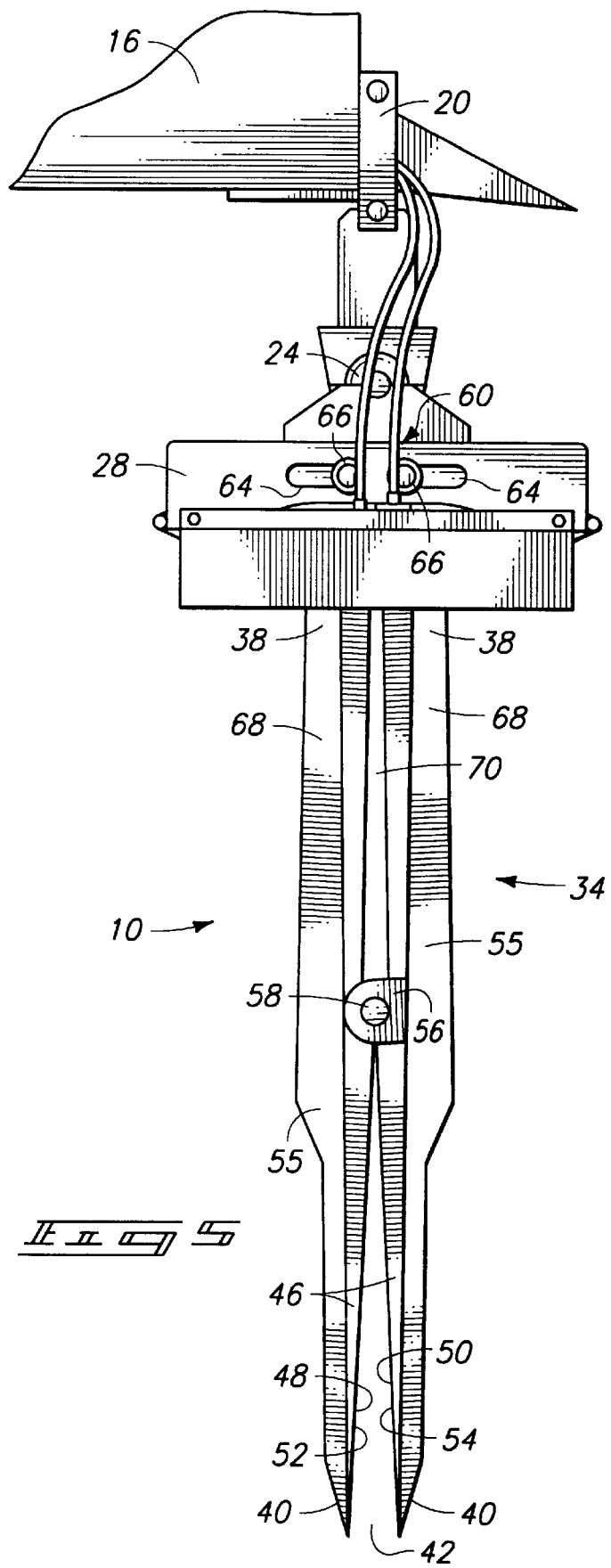

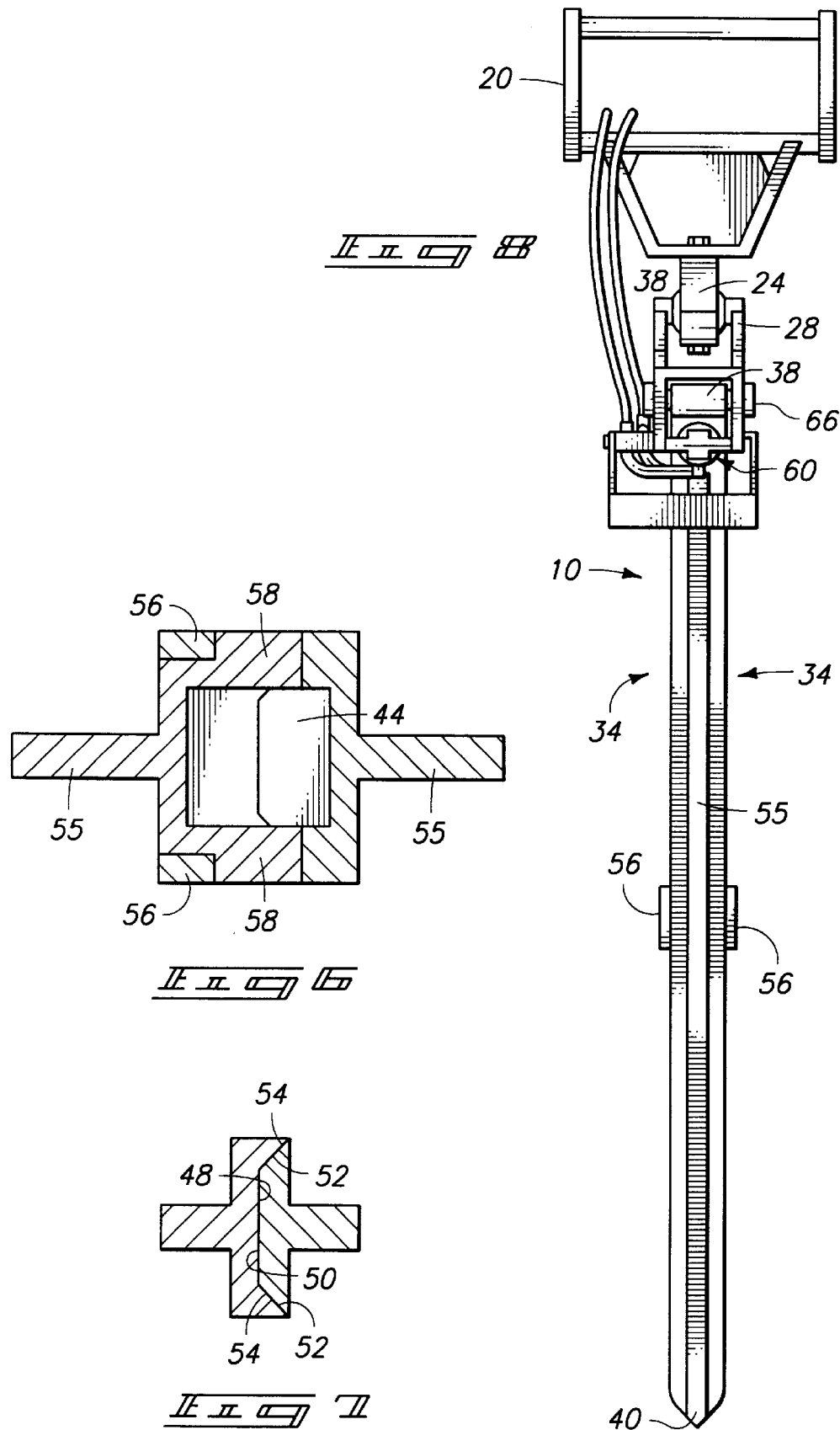

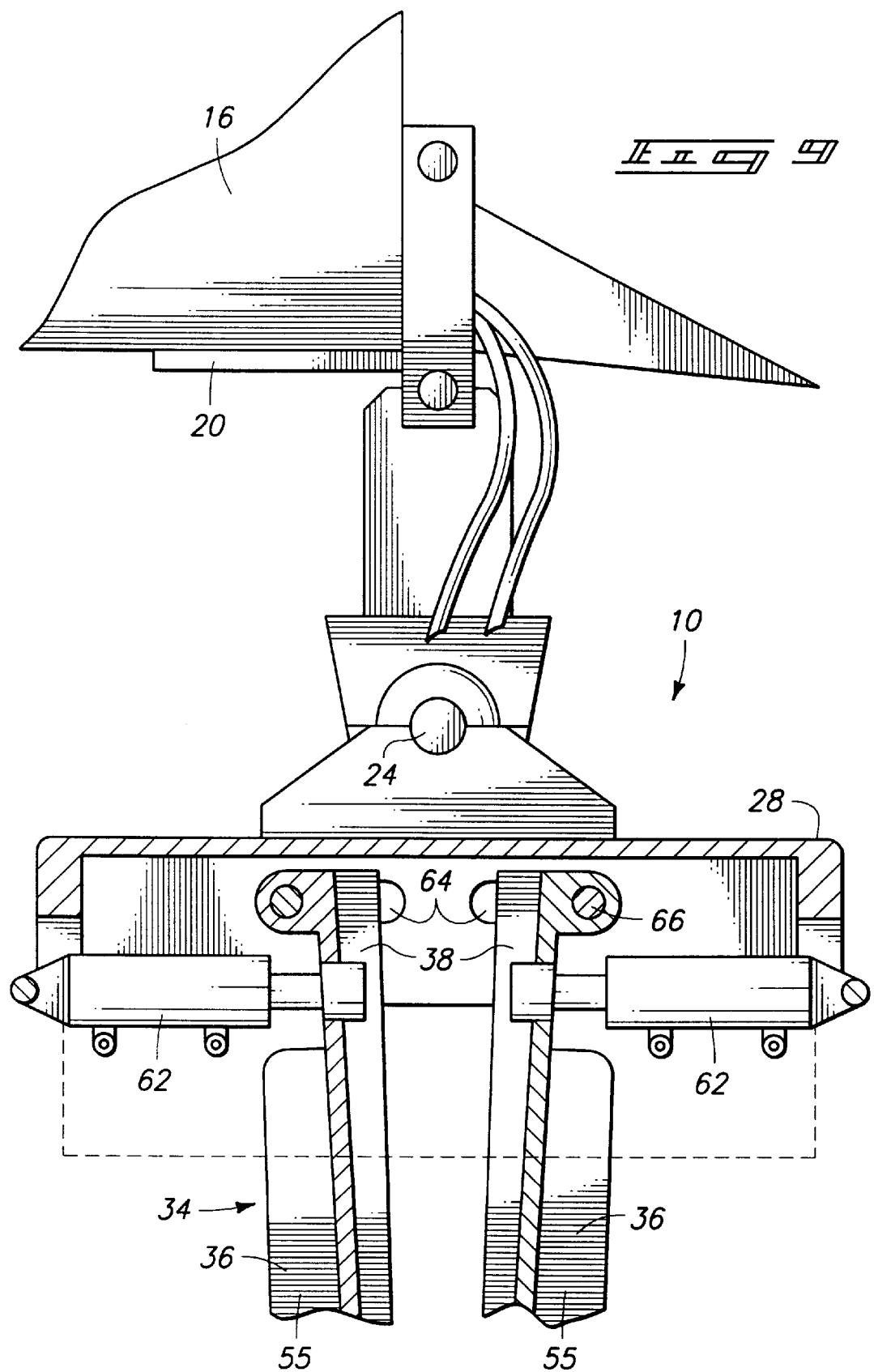

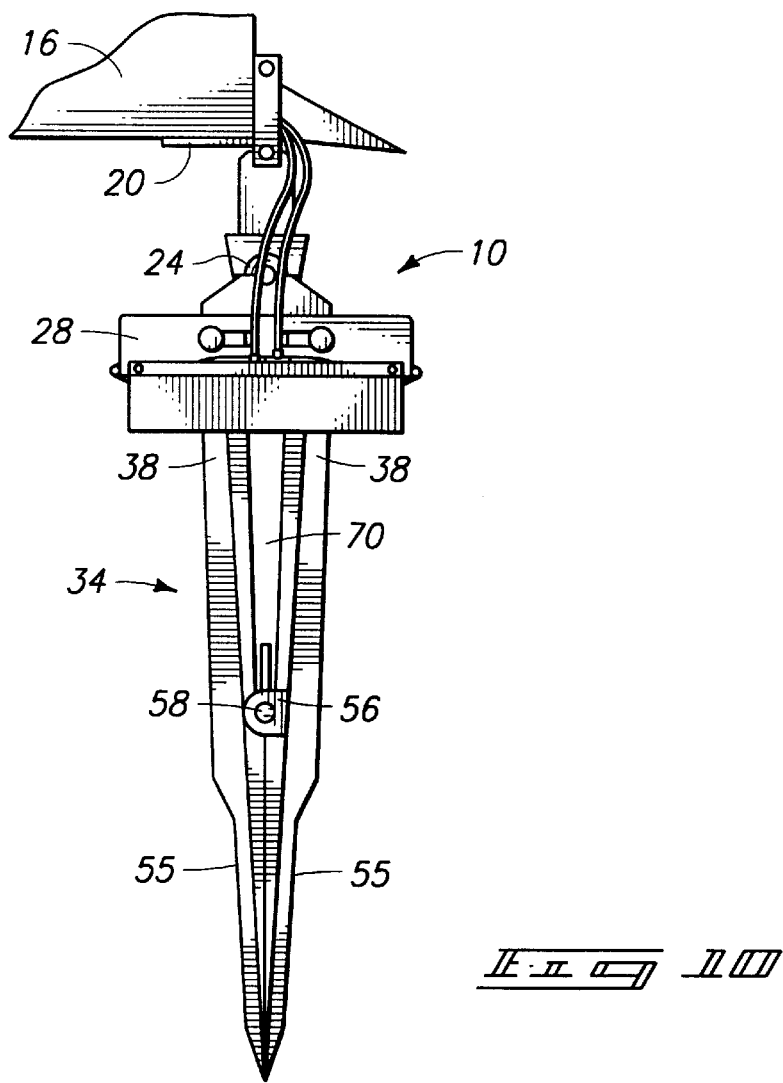
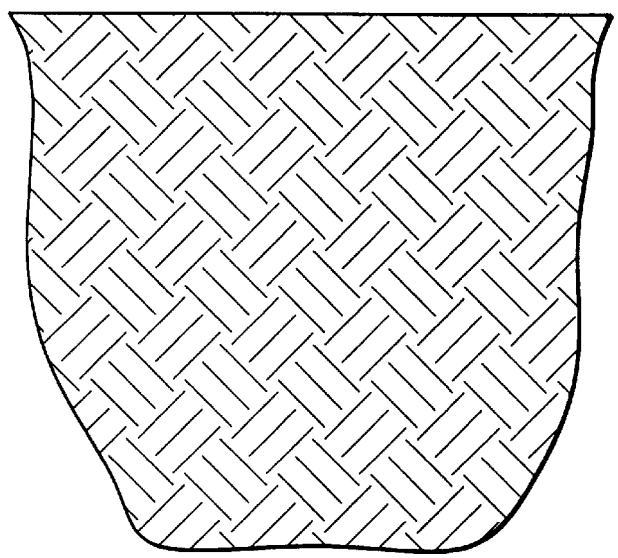
FIG. 10

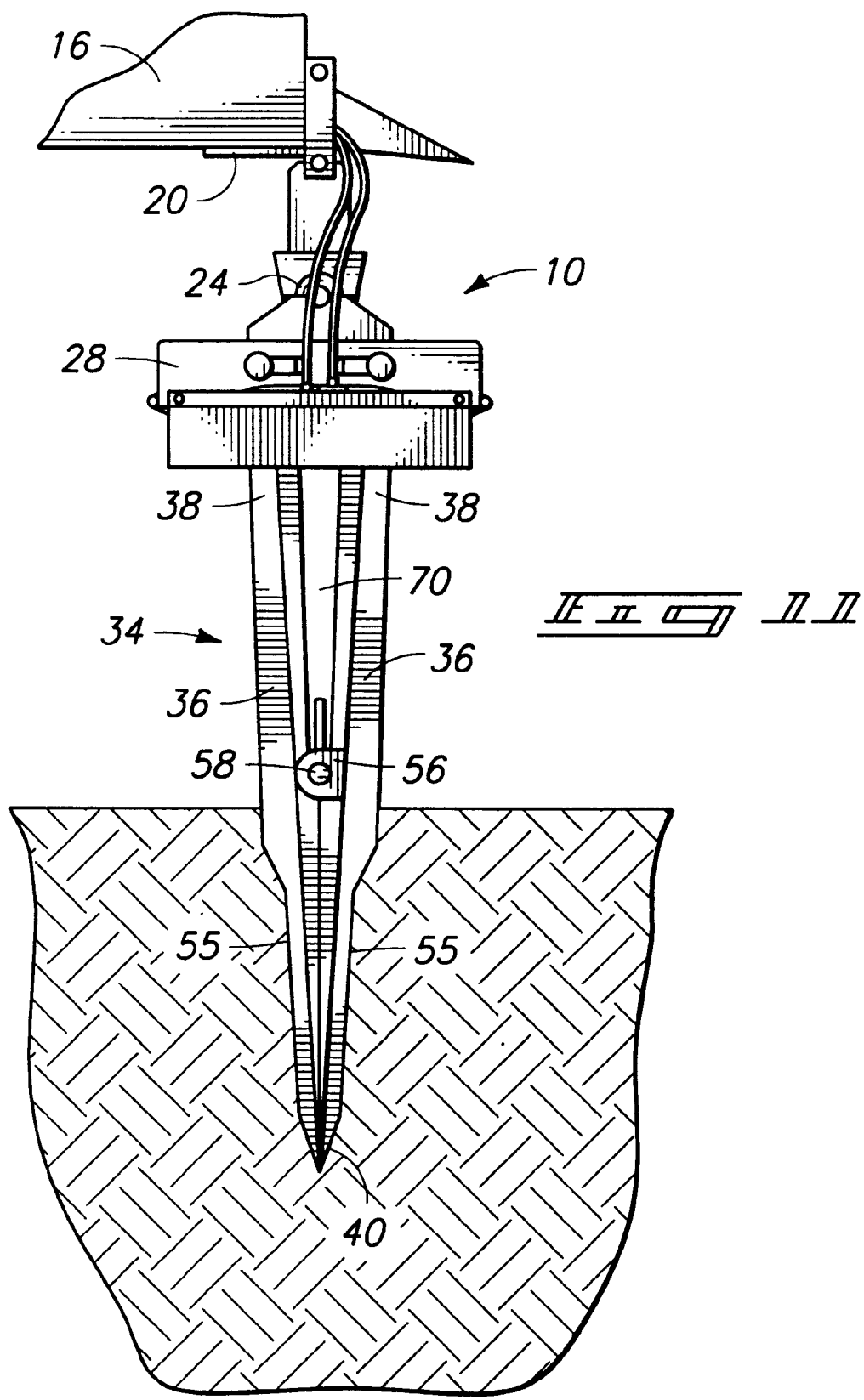

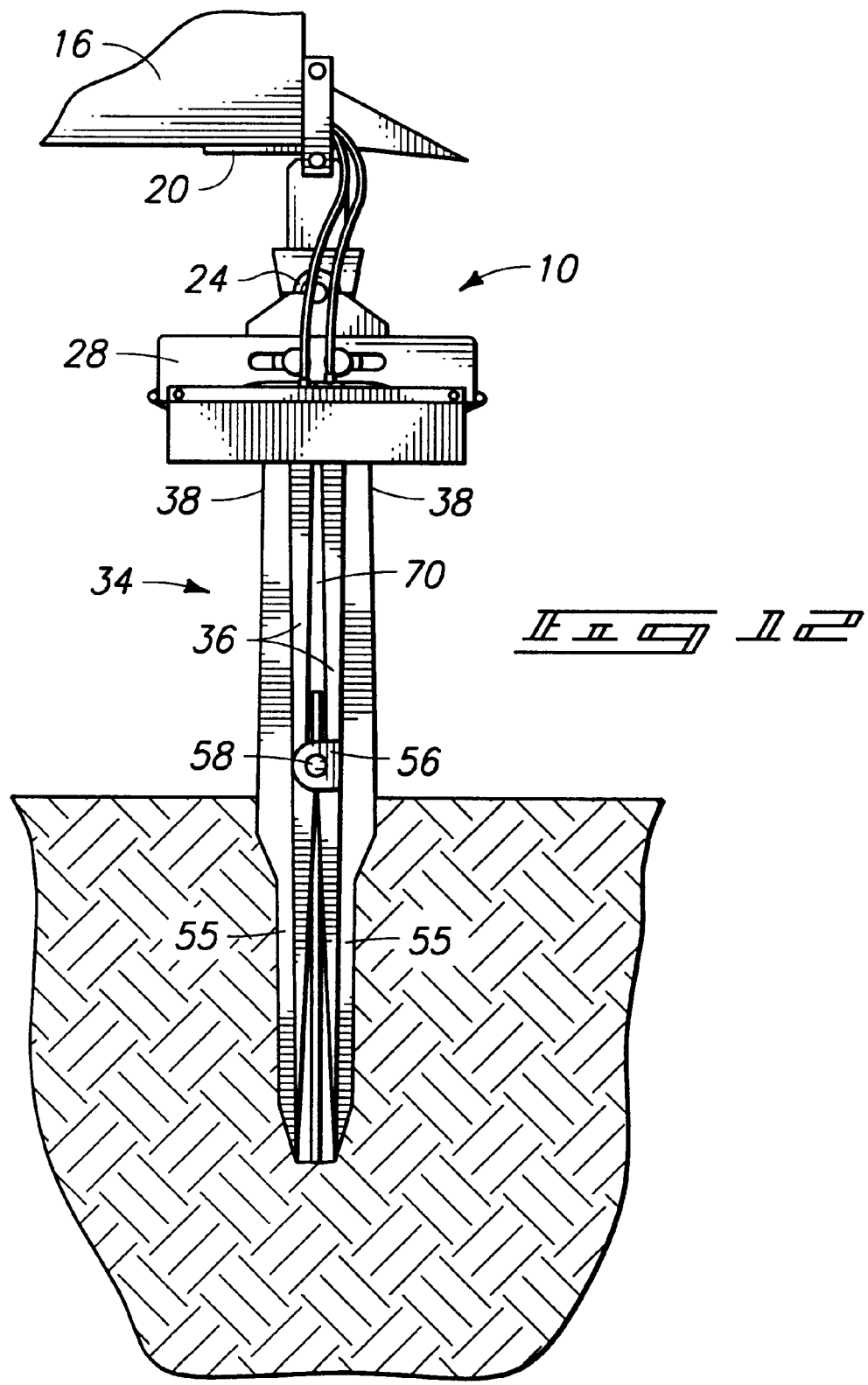

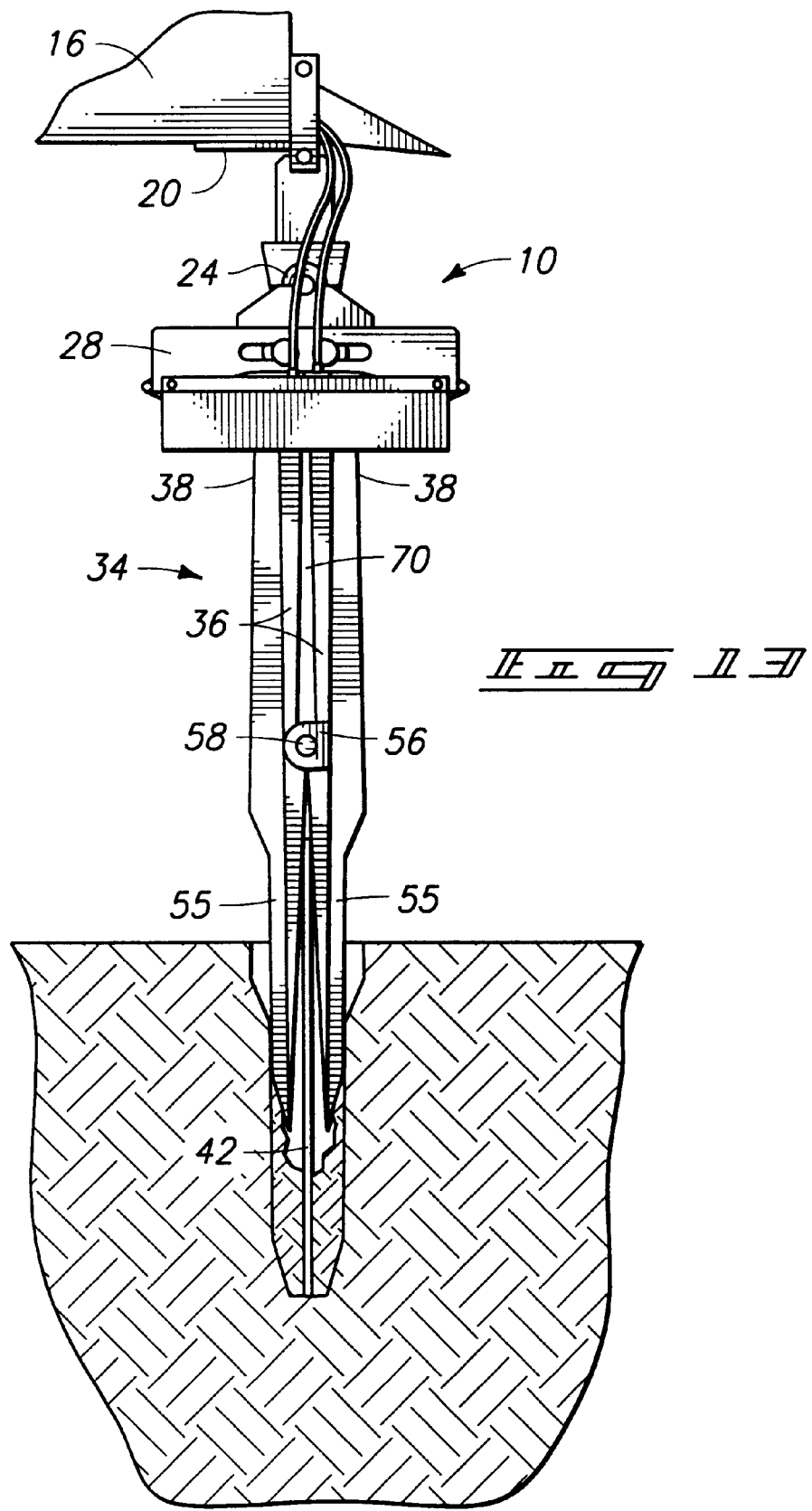

EXPANDABLE STINGER PLANTER

TECHNICAL FIELD

The present invention relates to planting and more particularly to apparatus for performing planting operations.

BACKGROUND OF THE INVENTION

Planting of vegetation in rough terrain has long been a difficult and tedious process. In fact, most planting done on steep embankments or rocky terrain has been accomplished by hand, because mechanized planters are often not capable of negotiating the terrain. Further, bulky planting machinery can damage the surrounding area and seriously compromise the surrounding habitat.

Hand planting in steep, rocky, or otherwise rough terrain is often not successful because the conditions do not permit the planter to dig deep enough to secure the plants. Also riparian areas are typically difficult to plant because the plant stock cannot be secured deeply in the embankment to prevent high water from washing the plants away.

Re-planting vegetation along riparian ways that have been denuded by flooding is ecologically desirable, not only to bolster the shorelines against erosion, but also to re-establish fish and wildlife habitat. Still, it is difficult and sometimes seemingly impossible to successfully plant such areas. Shallow rooted whips of willow, cottonwood and the like are easily washed away at high water, or become easy forage for beaver and deer, so strenuous hand planting operations in such areas do not often result in an acceptable percentage of surviving plants.

Even flat fertile areas can be difficult to re-plant. For example, closely spaced stumps in clear cut areas will often prevent the use of mechanized planting, so expensive hand planting is often the only process available. Further, the ground may be bound with roots, rocks, or hard soil, frustrating hand planting processes.

Another problem faced in mechanized and hand planting operations, is that planting dibbles, shovels, picks and the like will often leave a hole with a packed wall caused by the tool wedging into the soil. This "shear wall" will hamper proper dispersal of roots and often results in poor or unsuccessful growth.

A present and growing need is therefor realized for a mechanized planter that will reduce, if not eliminate, the need for hand planting in difficult areas. There is also a need for a mechanized planter that will function to plant at a much greater depth than has yet been feasible in hand or mechanized planting operations, without creating the "shear wall" effect.

As a solution to the above problems, the present invention has for a first objective to provide a mechanized stinger planter that can be attached to a boom for remote operation, so difficult terrain can be planted from adjacent accessible areas.

A further objective is to provide such a planter that may be used for deep planting operations for planting whips and root crop to avoid wash out and damage from animals.

A still further objective is to provide such a planter that will operate to minimize or eliminate "shear wall" packing in planting holes and that will allow loose soil backfill to fill the openings produced by the probes and thereby promote healthy plant growth.

The above and still further objects and advantages will become apparent from the following description which, taken with the accompanying drawings, disclose the best presently known mode of carrying out the present invention.

BRIEF DESCRIPTION OF THE DRAWINGS

Preferred embodiments of the invention are described below with reference to the following accompanying drawings.

FIG. 4 is an enlarged side elevation view of the preferred stinger planter in a closed position;

FIG. 5 is a view similar to FIG. 4 only showing the preferred stinger in an open position;

FIG. 6 is an enlarged sectional view taken substantially along line 6—6 in FIG. 4;

FIG. 7 is an enlarged sectional view taken substantially along line 7—7 in FIG. 4;

FIG. 8 is a front elevational view as seen from the right in FIG. 4;

FIG. 9 is an enlarged fragmented view showing a preferred actuator assembly and pivot member; and FIGS. 10–13 are fragmented operational views illustrating a planting operation using the present stinger planter.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 2:
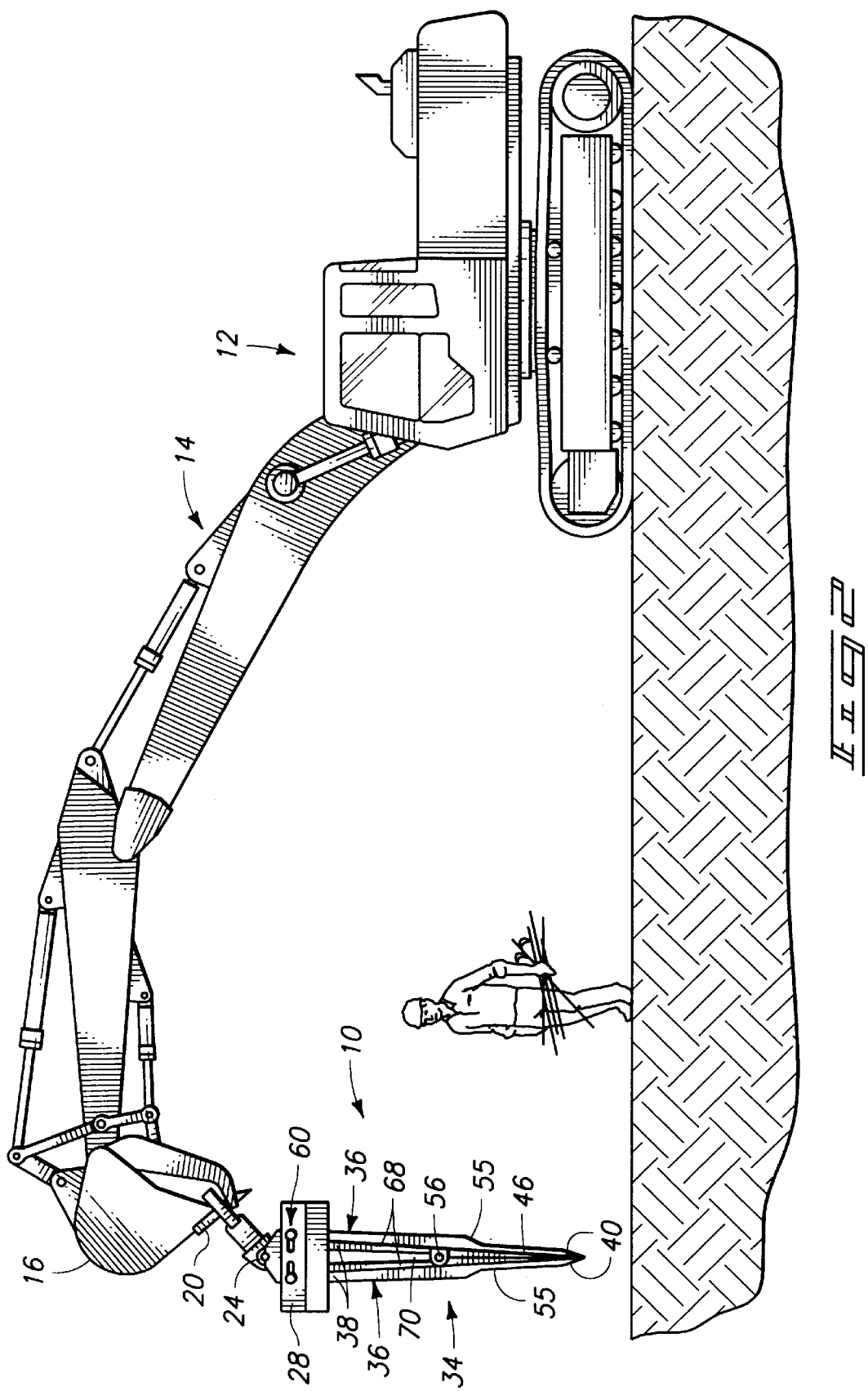
FIG. 2 is a view similar to FIG. 1 only showing the stinger planter positioned above the soil.
Figure 3:
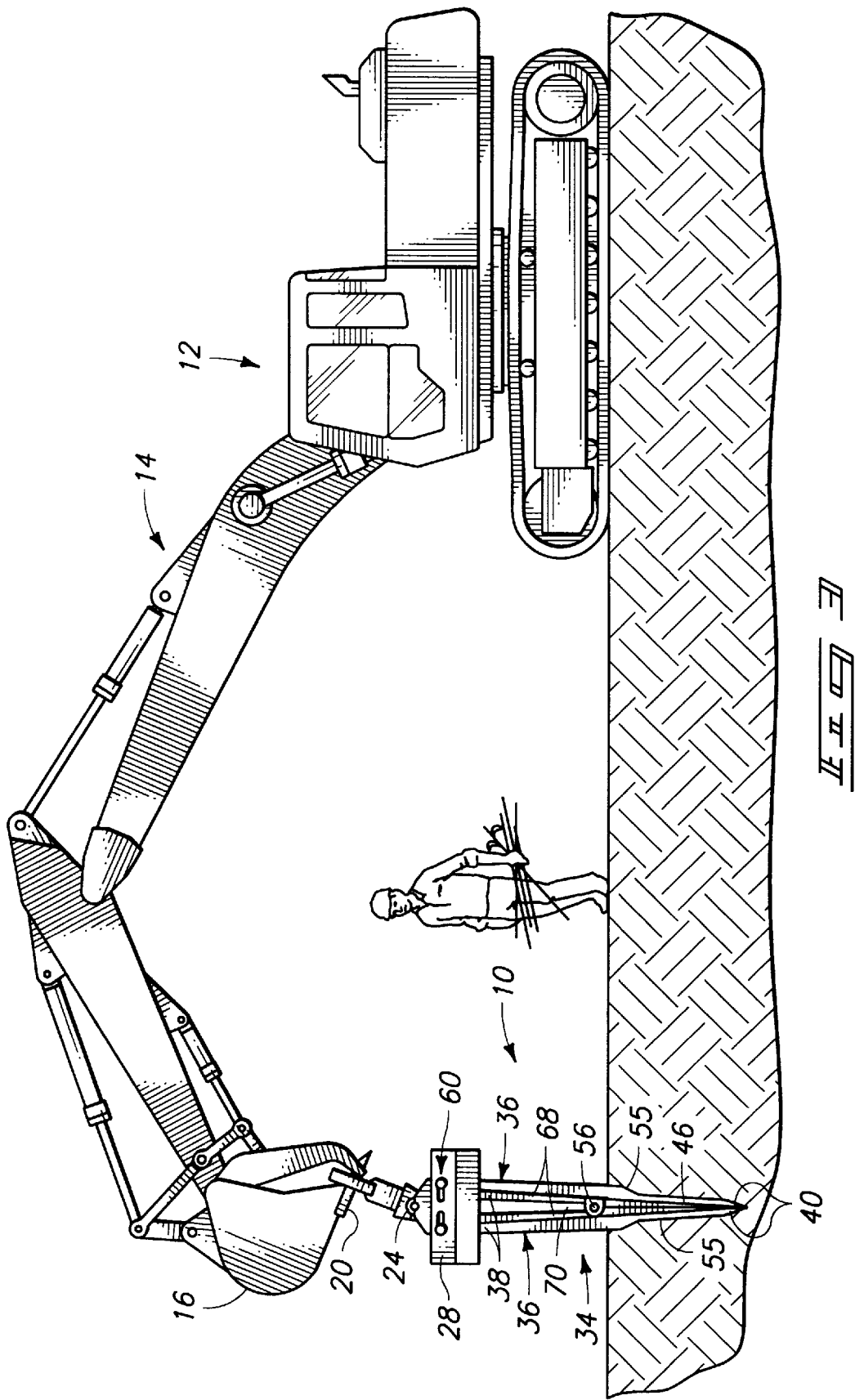
FIG. 3 is a view similar to FIG. 2 only showing the stinger planter driven into the soil.

A preferred embodiment of the present expandable stinger planter is designated generally in the drawings by the reference numeral 10. The preferred planter 10 is produced as an attachment that may be mounted to an earth working device such as the excavator 12 shown in FIGS. 1–3. It is advantageous that the planter 10 be adapted for mounting to the end of an excavator type boom 14 to facilitate planting operations at locations remote from the excavator chassis.

The present planter 10 may be mounted to an excavator bucket 16, without requiring modification of the bucket other than possibly holes drilled for mounting bolts. The planter 10 is simply secured to the bucket end and can thereby be positioned through use of the existing bucket positioning controls provided in the excavator. Further, the drive components provided within the planter may be connected to appropriate existing power sources supplied by the excavator.

In a preferred embodiment, the present planter 10 includes a base frame 20 that is configured to be secured to an excavator type boom. It is noted that the base frame may be provided in alternate forms to facilitate mounting to various forms of booms, buckets, or other boom end hardware on an excavator or related machine. The base frame 20 may be releasably attached using conventional fasteners such as bolts, clamps, or other fasteners well known in the fastening art as will be readily realized by those of ordinary skill in the art.

In one preferred form, a pivot member 24 is mounted to the base frame. It is advantageous that the pivot member 24 be a form of ball joint, universal joint, or other pivot link arrangement that will permit relatively free pivotal movement of the planter 10 below the base frame 20. It is most preferable that the pivot member 24 allow the planter 10 to pivot about a point (at intersecting vertical and horizontal pivot axes) just below the base frame to allow the operator a wide selection of penetration angles for the planter 10. This capability may be understood by comparing FIGS. 1 and 3.

A stinger mounting frame 28 is operatively mounted to the base frame 20, most preferably by way of the pivot member 24 as exemplified in FIG. 9. The exemplified stinger mounting frame 28 is formed of rigid metal such as steel with a top plate secured to the pivot member 24 and side plates depending downwardly to form a channel for receiving and suspending upper ends of a stinger which is generally identified at 34. The side plates also function to protect internal drive components which will be described in greater detail below.

A preferred stinger 34 is comprised of a pair of elongated probes 36 that are preferably fabricated of rigid material of a type commonly used in ground working tools. The probes extend from top ends 38 that are mounted to the stinger mounting frame 28 to bottom ends 40 that are configured for ground penetration. In a preferred form, the probes 36 include a length dimension between the top and bottom ends 38, 40 of approximately eight feet. Probes 36 of this length have been successfully used to plant both rooted stock and long plant whips (cuttings).

Bottom ends 40 of the probes, which are normally held in a closed ground penetrating condition, are separable to form a plant discharge opening 42. The bottom probe ends 40 are held in the closed position during ground penetration, then may be selectively spread to allow discharge of a plant through the discharge opening 42.

The probes 36 also define an upwardly open internal plant receiving receptacle 44 (see FIG. 6). The receptacle 44 is centrally located between the probes above the bottom ends 40. Plants may be manually inserted into the receptacle 44 and are protected by the probes during ground penetration. However, the receptacle 44 will open through the plant discharge opening 42 once the probes are shifted to the open position. At this point the plant may be discharged through the plant discharge opening 42 as the open probes are lifted.

The probes 36 each include ground penetrating portions 46 with facing surfaces 48, 50 that are in substantial flush engagement with one another at the closed position. In preferred forms, the surfaces 48, 50 include formed edge surfaces 52, 54 (FIG. 7) that are configured to nest together in a partial overlapping relationship at the closed position. This is done to reinforce the probes during ground penetration and prevent bending or misalignment.

Longitudinal reinforcing ribs 55 are welded or otherwise formed along preferred configurations of the probes 36 and that project outwardly therefrom. The ribs 55 preferably extend the full stinger length and add structural rigidity to the probes. The ribs 55 also serve to prevent "shear" or hard packed surfaces of the ground opening that might otherwise be formed as the probes are inserted and then withdrawn from the ground. It is advantageous that the ribs 55 be tapered to downward points at the bottom probe ends 40 to facilitate ground penetration.

The probes are substantially mirror images of one another with the exception of the different edge surfaces 52, 54; and overlapping hinge members 56, 58. The hinge members join the probes for pivotal movement, thereby providing a preferred mechanism by which the probes may be shifted between the open and closed positions. The hinge members 56, 58 interfit and define a probe pivot axis that is located approximately mid-way along the probe length dimension. The probe pivot axis is preferably transverse to the probe length and positioned so that when the top probe ends 38 are moved together, the bottom ends 40 will move apart (to form the discharge opening 42).

It is noted that the hinge members are substantially flush with the outside surfaces of the probes so they do not interfere as the probes are inserted into the ground surface. Also the hinge members 56 are situated on opposite sides of the probes, as shown in FIG. 6, leaving the receptacle 44 open and unobstructed for reception and discharge of plant whips or root stock.

FIG. 9 exemplifies a preferred actuator assembly 60 that is mounted between the stinger mounting frame 28 and at least one of the elongated probes 36. The actuator assembly 60 is provided to selectively pivot said at least one of the probes about the probe pivot axis between the open and closed positions. Most preferably, the actuator assembly is functional to forcibly shift both probes 36 about the probe pivot axis.

The preferred actuator assembly is comprised of ram cylinders 62 that are mounted between the probe top ends 38 and the stinger mounting frame 28. The ram cylinders 62 may be connected to appropriate hydraulic pressure sources and controls provided in the excavator for selective operation to extend and retract, thereby causing corresponding movement of the bottom probe ends 40 between the open and closed positions.

As shown in the FIG. 9 embodiment, the probe top ends 38 are slidably mounted to the stinger mounting frame 28. Horizontal slots 64 are formed in the frame 26 for this purpose, guiding rollers 66 that are mounted to the probe top ends 38. The slots permit lateral motion of the rollers 66 and probe top ends as effected by the ram cylinders 62.

It is understood that a single cylinder could be mounted between the upper probe ends to effect the desired probe movement between the open and closed positions. Other actuators might also be used that are not shown in the present drawings, but that fall within the scope of the appended claims. For example toggle links could be connected to the top probe ends, operated by an electric or hydraulic jack screw, linear actuator, or ram cylinder to force selective pivotal motion of the probes. However it is presently preferred that the two cylinders exemplified herein be used to enable independent movement of the probes about their common pivot axis.

Preferred forms of the probes also include upper leg portions 68 that extend between the probe pivot axis and the top ends 38. The upper leg portions are spaced apart when the probes are in the closed positions to form at least one and preferably two opposed access openings 70 communicating with the upwardly open internal plant receiving receptacle 44. The openings 70 allow for manual insertion of plants or whips into the receptacle.

Operation of the present invention may now be understood with reference to FIGS. 10–13, and assuming the planter 10 has previously been attached to an excavator 12 at a remote boom end. It is also assumed that the planter actuator assembly has been connected to the associated excavator power supply and controls.

The excavator operator may elect to move the excavator using the conventional controls and drive mechanisms, to an area to be planted. The boom is then shifted to a position for easy access by an individual who then places a plant (seedling or whip) into the receptacle 44. This is accomplished by simply inserting the plant through one of the access openings, and allowing the plant to drop into place within the recess. The closed bottom ends of the probes will prevent the plant from dropping, and the rigid lower parts of the probes will protect the plant.

Now the operator may use the conventional controls in the excavator to swing the boom and planter to a selected planting location. The boom is then lowered under power, driving the probes deep into the ground (FIG. 11).

Figure 1:
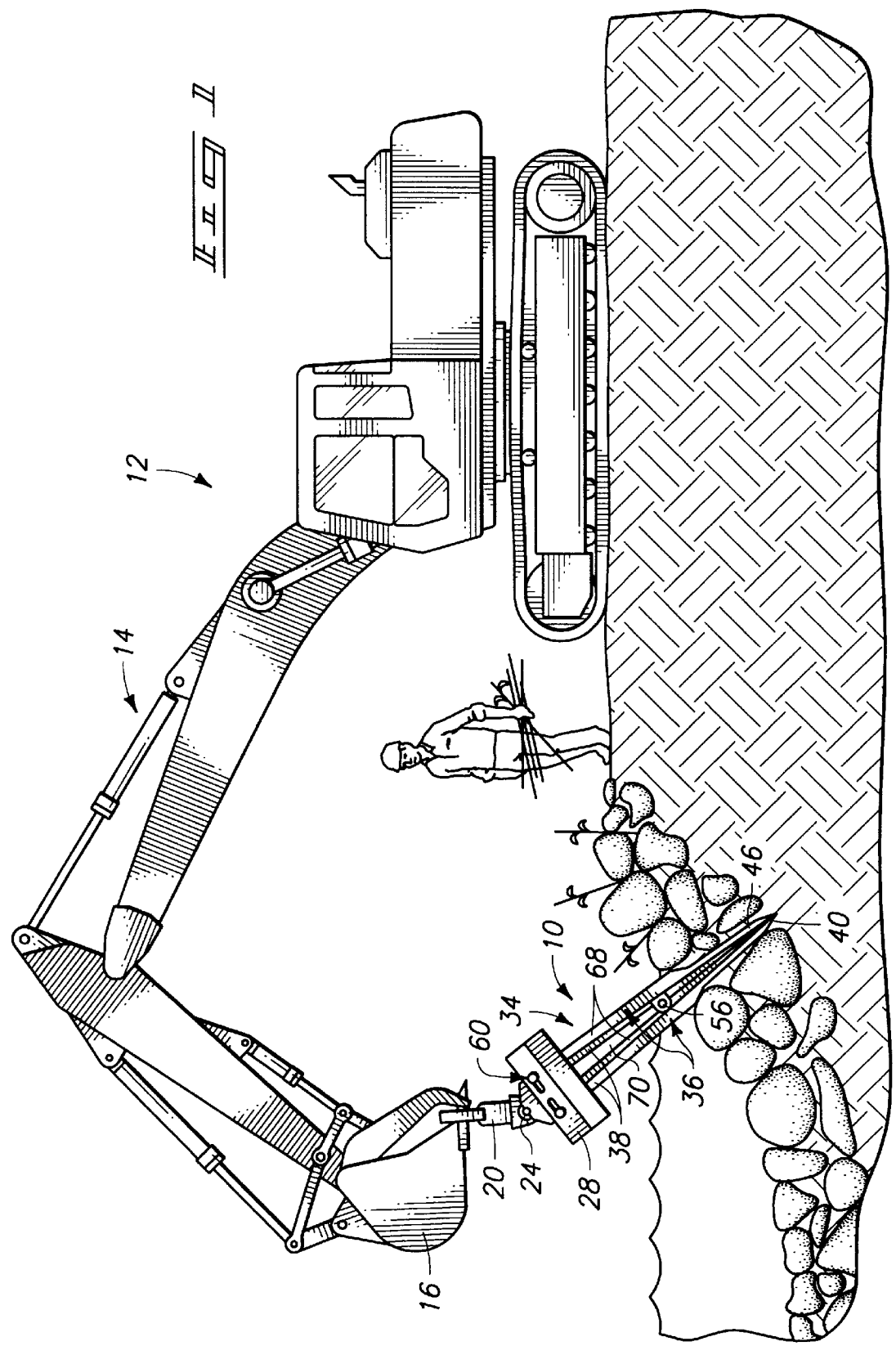
FIG. 1 is a side elevation view of an excavator mounting a first preferred form of the present stinger planter.

If rocks are encountered, the user may shift the boom to angle the probe off vertical, while continuing downward pressure. FIG. 1 exemplifies a condition where rocks were encountered and the boom was shifted to gain penetration. This function is enabled by provision of the pivot member 24, which will allow the planter to be shifted angularly while downward pressure is applied.

Once the probe reaches the desired depth, appropriate controls may be operated to activate the actuator assembly 60, causing the probes to open (FIG. 12). The bottom probe ends will separate, forming the discharge opening 42 and allowing the plant to drop.

The operator may now use appropriate controls in the excavator 12 to raise the boom 14 and thereby lift the probe upwardly. This step is accomplished with the probes in the open condition. The plant will remain elevationally stationary as the probes are raised (FIG. 13).

It is noted that the ground at the bottom probe ends is pushed laterally away, enlarging the ground opening. Then, as the probes are lifted (while being held in the open position) the longitudinal ribs 55 function to break up the compressed earth and allow the now loosened soil to fill the hole. Thus "shear" or compaction of the soil about walls of the opening is avoided and the plant will have a better chance for successful starting in the surrounding loosened soil.

Once the probes have been pulled upwardly free of the ground and the top end of the plant has cleared the probe bottom ends 40, the operator may operate the actuator assembly 60 to close the probes in preparation for receiving the next plant.

The above planting process may be repeated as often as desired with the excavator basically remaining in one position. When an adequate number of plants have been placed, the user may elect to move the excavator to another location where the above steps may be repeated.

It may be understood from the above, that the present invention provides a mechanized stinger planter that can be attached to a boom for remote operation, so difficult terrain can be planted from adjacent accessible areas. In fact, FIG. 1 shows such operation; where the probes are used to plant along a rocky riparian hillside.

It may be further understood that the present planter may be used for deep planting operations for planting whips and root crop to avoid wash out and damage from animals. The depth is selected by the operator, and may be such that only a small part of the overall plant length is exposed above the ground surface. The plant is thus protected against wash out. Further, even if foraging animals eat the tops of the plants, the bulk of the plant will remain below grade and will stand a good chance to take root and survive.

It may also be understood that the present planter will operate to minimize or eliminate "shear wall" packing in planting holes and will allow loose soil to backfill the opening produced by the probes to promote healthy plant growth. This is an advantage, as described above, provided by the ribs 55 which break up the compacted soil as the probes are lifted.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An expandable stinger planter for attachment to an excavator type boom, comprising:

a base frame configured to be secured to the excavator type boom;

a pivot member mounted to the base frame;

a stinger mounting frame mounted to the pivot member;

a stinger comprised of a pair of elongated probes mounted to the stinger mounting frame and having bottom ends configured for movement about a pivot point defined by the pivot member;

an actuator assembly mounted between the stinger mounting frame and at least one of the elongated probes;

wherein the actuator assembly is selectively operable to shift the probes relative to one another between a closed position wherein the bottom ends are closed together, and an open position wherein the bottom ends are spaced apart from one another to form a plant discharge opening; and wherein the probes form an upwardly open internal plant receiving receptacle that is open to the plant discharge opening at the open position whereby a plant placed in the plant receiving receptacle may be discharged through the plant discharge opening.

2. An expandable stinger planter as defined by claim 1 wherein the pivot member is secured between the stinger mounting frame and base frame about intersecting vertical and horizontal pivot axes.

3. An expandable stinger planter as defined by claim 1 wherein the pivot member is secured between the stinger mounting frame and base frame about intersecting vertical and horizontal pivot axes and wherein the probes and stinger mounting frame are free to pivot about the intersecting vertical and horizontal pivot axes.

4. An expandable stinger planter as defined by claim 1 further comprising reinforcing ribs formed along the probe members and that project outwardly therefrom.

5. An expandable stinger planter as defined by claim 1 further comprising reinforcing ribs formed along the probe members and that project outwardly therefrom; and wherein the ribs taper to pointed ends at the bottom ends of the probes.

6. An expandable stinger planter as defined by claim 1 wherein the probes include top ends mounted to the stinger mounting frame and wherein the probes include a length dimension between the top and bottom ends of approximately eight feet.

7. An expandable stinger planter as defined by claim 1 wherein the probes are pivotably mounted to one another about a probe pivot axis and wherein the actuator assembly is connected to at least one of the probes to pivot said at least one of the probes about the probe pivot axis between the open and closed positions.

8. An expandable stinger planter as defined by claim 1 wherein the probes are pivotably mounted to one another about a probe pivot axis and wherein the actuator assembly is comprised of ram cylinders mounted between the stinger mounting frame and top ends of the probes; and wherein the ram cylinders are operable to pivot the bottom ends of the probes between the open and closed positions.

9. An expandable stinger planter as defined by claim 1 wherein the probes include top ends and wherein the top ends are slidably mounted to the stinger mounting frame.

10. An expandable stinger planter as defined by claim 1 wherein the probes include a length dimension and are joined for pivotal movement at a probe pivot axis that is located approximately mid-way along the length dimension.

11. An expandable stinger planter as defined by claim 1 wherein the probes are joined at a probe pivot axis for pivotal movement relative to one another and further include ground penetrating portions with facing surfaces extending approximately from the probe pivot axis to the bottom ends; and wherein the ground penetrating portions are in substantial flush engagement with one another at the closed position.

12. An expandable stinger planter as defined by claim 1 wherein the probes include ground penetrating portions with facing surfaces that are in substantial flush engagement with one another at the closed position.

13. An expandable stinger planter as defined by claim 1 wherein the probes are connected to one another for pivotal movement about a probe pivot axis;

wherein the probes include ground penetrating portions with facing surfaces that extend between the probe pivot axis and the bottom ends; and wherein the probes also include upper leg portions extending between the probe pivot axis and top ends of the probes, the upper leg portions being spaced apart to form an access opening communicating with the upwardly open internal plant receiving receptacle.

14. An expandable stinger planter as defined by claim 1 wherein each of the probes includes a ground penetrating portion;

wherein the ground penetrating portions include facing surfaces that are configured to nest together in a partial overlapping relationship at the closed position.

15. An expandable stinger planter as defined by claim 1 wherein each of the probes includes a ground penetrating portion;

wherein the ground penetrating portions include facing surfaces that are configured to nest together in a partial overlapping relationship at the closed position; and further comprising longitudinal reinforcing ribs formed along the probes and that project outwardly therefrom.

16. An expandable stinger planter for attachment to an excavator type boom, comprising:

a base frame configured to be secured to the excavator type boom;

a pivot member mounted to the base frame;

a stinger mounting frame mounted to the pivot member;

a stinger comprised of a pair of elongated probes secured together for relative pivotal movement about a probe axis that is transverse to the probes;

wherein the probes include upper ends disposed above the probe axis and movably mounted to the stinger mounting frame;

wherein the probes include ground penetrating bottom ends disposed below the probe pivot axis;

an actuator assembly mounted to at least one of the probes and selectively operable to shift the probes relative to one another about the probe axis between a closed position wherein the bottom ends are closed together, and an open position wherein said bottom ends are spaced apart from one another to form a plant discharge opening; and wherein the probes form an upwardly open internal plant receiving receptacle that is open to the plant discharge opening at the open position whereby a plant placed in the plant receiving receptacle may be discharged through the plant discharge opening.

17. An expandable stinger planter as defined by claim 16 further comprising reinforcing ribs formed along the probes that project outwardly therefrom.

18. An expandable stinger planter as defined by claim 16 further comprising reinforcing ribs formed along the probes and that project outwardly therefrom; and wherein the ribs taper to pointed ends at the bottom ends of the probes.

19. An expandable stinger planter as defined by claim 16 further comprising reinforcing ribs formed along the probes that project outwardly therefrom.

20. An expandable stinger planter as defined by claim 16 wherein the actuator assembly is comprised of ram cylinders mounted between the stinger mounting frame and top ends of the probes; and wherein the ram cylinders are operable to pivot the bottom ends of the probes between the open and closed positions.

* * * * *